US009731607B1

(12) United States Patent
Ratadiya et al.

(10) Patent No.: US 9,731,607 B1
(45) Date of Patent: Aug. 15, 2017

(54) VEHICLE BRAKE CONTROL SYSTEM

(71) Applicant: General Electric Company, Schenectady, NY (US)

(72) Inventors: Sarit Ratadiya, Bangalore (IN); Rajeev Verma, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/222,540

(22) Filed: Jul. 28, 2016

(51) Int. Cl.
*H02P 3/14* (2006.01)
*B60L 7/16* (2006.01)
*H02P 3/18* (2006.01)

(52) U.S. Cl.
CPC .................. *B60L 7/16* (2013.01); *H02P 3/18* (2013.01); *B60L 2210/44* (2013.01)

(58) Field of Classification Search
CPC ...... H02P 3/00; H02P 3/14; H02P 3/18; H02P 27/04; H02P 27/06; H02P 21/00; H02P 5/00; H02P 6/00; H02P 7/00; H02P 9/00; H02P 23/00
USPC ......... 318/400.01, 400.14, 400.15, 700, 721, 318/799, 599, 811, 430, 432, 800, 801, 318/362, 374, 375, 376, 371; 363/34, 40, 363/44, 55, 57, 95, 120, 174, 175
See application file for complete search history.

(56) References Cited

U.S. PATENT DOCUMENTS

| 3,890,551 | A | 6/1975 | Plunkett |
| 4,039,914 | A | 8/1977 | Steigerwald et al. |
| 4,093,900 | A | 6/1978 | Plunkett |
| 4,095,154 | A | 6/1978 | Williamson |
| 4,761,600 | A | 8/1988 | D'Atre et al. |
| 5,117,166 | A | 5/1992 | Kumar |
| 5,208,741 | A | 5/1993 | Kumar |
| 5,323,095 | A | 6/1994 | Kumar |
| 5,396,214 | A | 3/1995 | Kumar |
| 5,436,540 | A | 7/1995 | Kumar |
| 7,728,535 | B2 | 6/2010 | Kumar et al. |
| 9,121,913 | B2 * | 9/2015 | Singh ..................... G01R 31/42 |

* cited by examiner

*Primary Examiner* — Antony M Paul
(74) *Attorney, Agent, or Firm* — Global Patent Operation; John A. Kramer

(57) ABSTRACT

A vehicle brake control system includes an inverter configured to convert direct current (DC) into an alternating current (AC) for a motor of a vehicle. The inverter includes switches configured to convert the DC to the AC, as well as a resistor and a bypass switch disposed in series with each other. A controller is communicatively coupled with the inverter switches and the bypass switch. The controller opens the bypass switch so that the DC is conducted through and converted into the AC for the motor during a motoring mode. The controller closes the bypass switch so that regenerated current from the motor is conducted through the resistor of the inverter for partial dissipation of the regenerated current during a dynamic braking mode.

21 Claims, 5 Drawing Sheets

VEHICLE BRAKE CONTROL SYSTEM

FIELD

The inventive subject matter described herein generally relates to braking systems of vehicles.

BACKGROUND

Some vehicles use dynamic or regenerative braking to slow or stop movement of the vehicles. This type of braking can involve obtaining energy from traction motors of the vehicles (when the motors are rotated by the movement of the vehicles instead of the motors rotating to move the vehicles) and dissipating this energy in resistance grids.

During high speed travel, however, the available braking effort or braking horse power that is available from dynamic braking may be limited by the stability of the traction motors at the high speeds. The braking capability may be limited by a motor breakdown margin available at the link voltage of operation.

To maintain sufficient braking capability, one or more of the resistance grids may need to be disconnected from a circuit that connects the grids with the traction motors to allow sufficient braking resistance for maintaining stable operation of the vehicle. Disconnecting a parallel resistance grid, however, can lead to a significant loss of braking horse power and may not be desired by many vehicle operators.

BRIEF DESCRIPTION

In one embodiment, a vehicle brake control system includes an inverter configured to receive direct current (DC) along a bus from a power source and to convert the DC into an alternating current (AC) for a motor of a vehicle. The inverter includes inverter switches configured to alternate between open and closed states to convert the DC to the AC. The inverter also includes a resistor and a bypass switch disposed in series with each other between the bus on which the DC is received and a location between the inverter switches. The system also includes a controller configured to be communicatively coupled with the inverter switches and the bypass switch. The controller is configured to open the bypass switch so that the DC is conducted through and converted into the AC for the motor during a motoring mode. The controller is configured to close the bypass switch so that regenerated current from the motor is conducted through the resistor of the inverter for partial dissipation of the regenerated current during a dynamic braking mode.

In one embodiment, a braking circuit includes plural resistor grid legs configured to be conductively coupled in parallel to each other with a power source via positive and negative direct current (DC) buses. Each of the resistor grid legs includes a respective dissipation switch and a dissipation resistor. The braking circuit also includes an inverter configured to be conductively coupled with the positive and negative DC buses in parallel to the resistor grid legs. The inverter includes inverter switches configured to alternate between open and closed states to convert the DC to an alternating current that powers a motor. The inverter includes an inverter resistor and a bypass switch disposed in series with each other between the positive DC bus and a location between the inverter switches. The circuit also includes a controller configured to be communicatively coupled with the dissipation switches and with the bypass switch. The controller is configured to open at least one of the dissipation switches to disconnect the dissipation resistor in the same resistor grid leg from the motor during a dynamic braking mode. The controller also is configured to close the bypass switch in the inverter so that regenerated current produced by the motor during the dynamic braking mode is conducted through the inverter resistor and at least one of the dissipation resistors in at least one of the resistor grid legs that remains coupled with the motor during the dynamic braking mode.

In one embodiment, a method includes (during a motoring mode of a vehicle power supply circuit that includes plural resistor grid legs that dissipate regenerated current from one or more motors of the vehicle and that includes one or more inverters having inverter switches that convert a direct current (DC) to an alternating current (AC) that powers the one or more motors) opening one or more first bypass switches in the one or more inverters to direct the DC through the inverter switches. The method also includes (during a dynamic braking mode of the vehicle power supply circuit) closing the one or more first bypass switches to conduct regenerated current created by the one or more motors through one or more inverter resistors instead of through the inverter switches to increase a total resistance through which the regenerated current is dissipated.

DETAILED DESCRIPTION

One or more embodiments of the inventive subject matter described herein provide vehicle brake control systems and methods that use switching devices, such as choppers, inverters, or the like, to continuously or semi-continuously vary the total resistance provided by resistance grids of a dynamic brake system. The total resistance of the grids is changed (e.g., increased) by smaller increments at a time than would be achieved by disconnecting an entire leg of the grids at a time. The continuous or semi-continuous variation of total grid resistance allows for maintaining the resistance needed for braking at high speeds. In one embodiment, an inverter of a vehicle can be used as the switching device during braking. This can allow for the continuous or semi-continuous variance of braking resistance without adding additional parts or cost to the vehicle.

Figure 1:
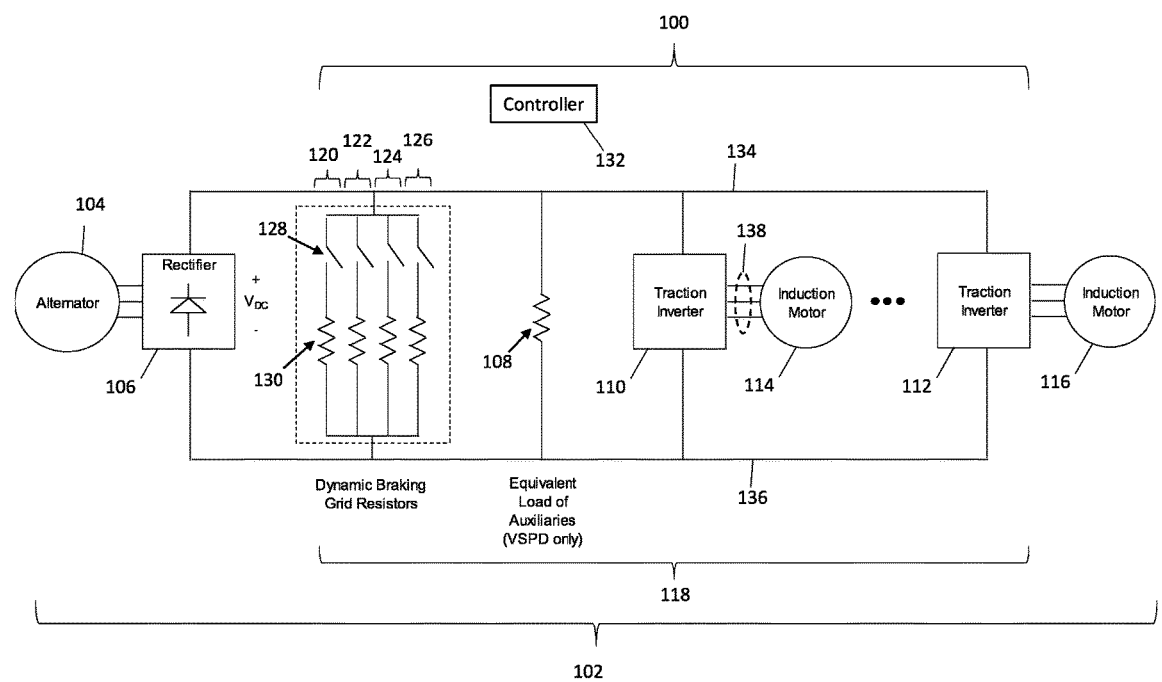
FIG. 1 illustrates one embodiment of a vehicle brake control system.

FIG. 1 illustrates one embodiment of a vehicle brake control system 100. The control system 100 operates with a power supply circuit 102 of a vehicle, such as a locomotive, an automobile, a marine vessel, or the like. The power supply circuit 102 includes a power source 104 ("Alternator" in FIG. 1) that generates electric current. While the power source 104 is shown as an alternator, alternatively or additionally, the power source 104 may be one or more generators, batteries, catenaries, capacitors, flywheels, etc. The circuit 102 connects the power source 104 with a rectifier 106 to convert the current provided by the power source 104 into a direct current VDC.

The circuit 102 conducts the direct current to one or more auxiliary loads 108 and to inverters 110, 112 ("Traction Inverter" in FIG. 1) of a propulsion system of the vehicle.

The auxiliary loads 108 represent loads that perform work that is not used to propel the vehicle, such as to power blowers or fans, provide electrical service to passengers, climate control, etc. The inverters 110, 112 are coupled with traction motors 114, 116 ("Induction Motor" in FIG. 1) and are configured to convert the direct current into an alternating current for the traction motors 114, 116. The inverters 110, 112 may be three phase inverters that receive positive and negative portions of the direct current (DC) from the rectifier 106 via a positive DC bus 134 and a negative DC bus 136, respectively. The inverters 110, 112 convert the DC current into three phases of alternating current (AC) that is conducted to the motors 114, 116 along conductive buses 138, with each bus 138 conducing a different phase to the corresponding motor 114, 116. The traction motors 114, 116 are powered with the alternating current to rotate and thereby propel the vehicle. While two inverters 110, 112 and two motors 114, 116 are shown in FIG. 1, the circuit 102 may include a single inverter and/or a single motor, or may include more than two inverters and/or more than two motors.

The circuit 102 also includes or is coupled with a braking circuit 118. The braking circuit 118 includes several resistor grid legs 120, 122, 124, 126, with each leg 120, 122, 124, 126 having a dissipation switch 128 (e.g., a contactor or the like) and one or more resistors 130. As described below, one or more of the inverters 110, 112 also may be included in or otherwise part of the braking circuit 118. During dynamic braking, one or more of the traction motors 114, 116 generate electric current that is conducted in the circuits 102, 118. The switches 128 that are closed allow this current to be conducted to the corresponding resistors 130 where the current is dissipated out of the circuits 102, 118 as heat.

A controller 132 controls which switches 128 are open and which switches 128 are closed at different times. The controller 132 represents hardware circuitry that includes and/or is connected with one or more processors (e.g., microprocessors, integrated circuits, and/or field programmable gate arrays). The controller 132 generates control signals communicated to the switches 128 to change the states of the switches 128 (e.g., from an open state to a closed state, or vice-versa). The controller 132 is communicatively or operably coupled with the switches 128 by one or more wired and/or wireless connections (not shown). The controller 132 may generate the control signals based on input received from an operator of the vehicle, such as signals received from a brake throttle, brake pedal, button, mechanical switch, lever, touchscreen, stylus, microphone, etc. Optionally, the controller 132 may automatically generate the control signals based on designated operational settings, such as designated throttle and/or brake settings of the vehicle that dictate when and/or where the dynamic brakes are to be applied.

The controller 132 can connect or disconnect different legs 120, 122, 124, 126 at different times to change the total resistance available for dynamic braking. As more legs 120, 122, 124, 126 are connected to the traction motors 114, 116 (e.g., the corresponding switches 128 are closed), the total resistance available for braking is lower due to the resistors 130 in the legs 120, 122, 124, 126 being connected in parallel with each other. As fewer legs 120, 122, 124, 126 are connected to the traction motors 114, 116, the total resistance available for braking is greater.

But, the braking capability of the braking circuit 118 depends on the number of legs 120, 122, 124, 126 that remain conductively coupled with the motors 114, 116. As fewer legs 120, 122, 124, 126 are connected with the motors 114, 116, there are fewer resistors 130 for dissipating the energy of the regenerated current. Consequently, the braking capability of the braking circuit decreases with decreasing numbers of legs 120, 122, 124, 126 and/or resistors 130 being coupled with the motors 114, 116.

As described above, during high speed operation of the motors 114, 116 (e.g., the motors 114, 116 are operating at or above 50%, 60%, 70%, or another lower threshold of the maximum speed at which the motors 114, 116 can operate), more resistance may be needed to dissipate the regenerated electric current generated by the motors 114, 116 upon initiation of dynamic braking. But, some operators of vehicles may not wish to disconnect too many of the legs 120, 122, 124, 126 from the motors 114, 116 at high speed operation of the motors 114, 116, as described above.

One embodiment of the inventive subject matter described herein allows for the controller 132 to use one or more of the inverters 110, 112 to change the resistance available for dissipating the regenerated current created during dynamic braking by the traction motors 114, 116. This allows for finer control of changes in the total resistance when compared to opening or disconnecting one or more entire legs 120, 122, 124, 126 from the traction motors 114, 116.

Figure 2:
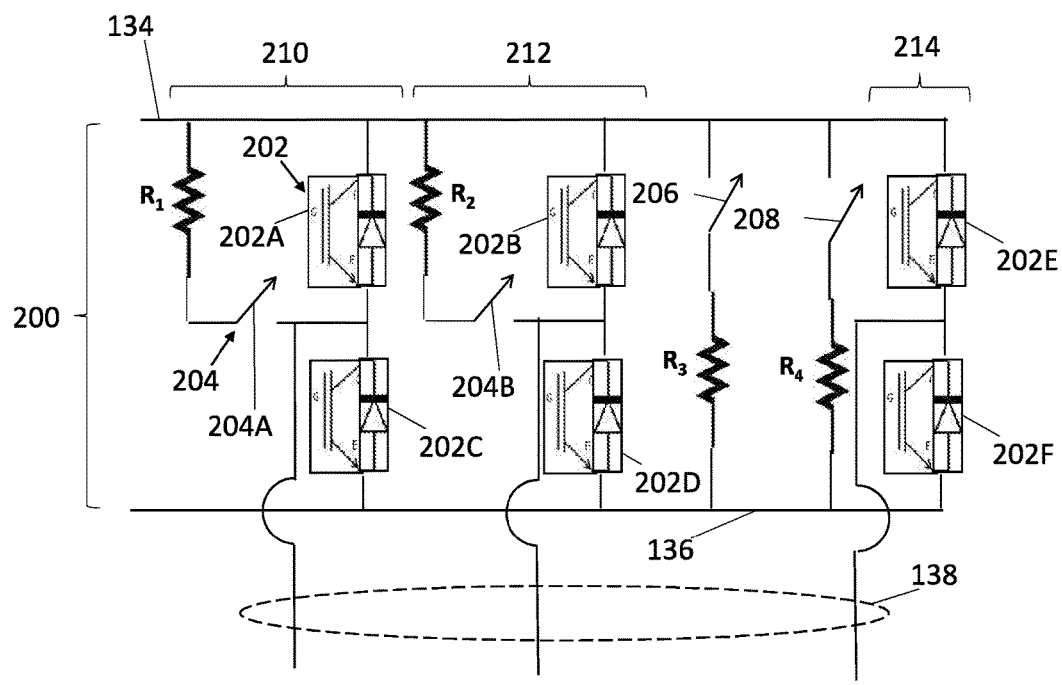
FIG. 2 illustrates one embodiment of an inverter.

FIG. 2 illustrates one embodiment of an inverter 200. The inverter 200 may represent one or more of the inverters 110, 112 shown in FIG. 1. The inverter 200 includes several switches 202 (e.g., switches 202A-F), which can represent insulated gate bipolar transistors (IGBTs) or other solid state switches, mechanical switches (e.g., contactors), or the like. The switches 202 can be referred to as inverter switches, as the controller 132 modulates these switches 202 between open and closed states to convert DC into AC, as described below.

The inverter 200 also includes several resistors R1-R4 and switches 204 (e.g., switches 204A-D). The switches 202 may be solid state switches while the switches 204 may be mechanical or moving switches. The switches 204 can be referred to as bypass switches as the controller 132 can close the switches 204 to cause DC received by the inverter 200 to be conducted through the inverter 200 without being conducted through the inverter switches 202. The inverter 200 includes switches 206, 208 which are coupled in series with resistors R3, R4 between the positive and negative DC buses 134, 136.

The switches 202, 204, 206, 208 are communicatively coupled with the controller 132 by one or more wired and/or wireless connections to allow the controller 132 to dictate and control which switches 202, 204, 206, 208 are open and which are closed at different times. The inverter 200 is connected with the positive DC bus 134 and the negative DC bus 136. The inverter 200 also is connected with a motor 114, 116 (shown in FIG. 1) by the conductive buses 138.

As shown in FIG. 2, each of the conductive buses 138 is connected with a different inverter leg 210, 212, 214, with each inverter leg including two inverter switches 202 connected in series with each other between the positive and negative DC buses 134, 136. Each conductive bus 138 connects with a different inverter leg in a location between the inverter switches 202 of that inverter leg. The switches 202 can alternate between open and closed states at a switching frequency in order to convert the DC received on the positive and negative DC buses 134, 136 into three phases of AC, with each phase of AC conducted along a different bus 138 to the motor 114 or 116.

As described above, the controller 132 can open switches 128 to disconnect different legs 120, 122, 124, 126 from the motors 114, 116 in the braking circuit (all shown in FIG. 1). But, disconnecting each leg 120, 122, 124, 126 from the braking circuit produces an abrupt decrease in the braking capability of the braking circuit. In order to reduce this abrupt decrease in braking capability each time a leg 120, 122, 124, 126 is disconnected from the motors 114, 116, the controller 132 can open or close different switches 204 at different times depending on an operational state of the circuit 102 or vehicle that includes the circuit 102.

For example, during motoring (e.g., where the motors 114 and/or 116 are operating or working to propel the vehicle along a route), the controller 132 can direct the bypass switches 204A, 204B to open or remain open. This causes the DC conducted along the positive DC bus 134 to be conducted into the switches 202 for converting the DC into AC. As described above, the switches 202 can alternate between open and closed states to convert the DC received on the buses 134, 136 to an AC that is conducted to the motor 114 or 116 along the buses 138. In this state, the inverter 200 powers the motor 114 or 116 to propel the vehicle along a route.

Another, different state is a self-load state. In this state, a load is placed on an engine of the vehicle that rotates to cause the power source 104 (e.g., an alternator) to generate electric current without supplying or converting this current for powering the motors 114, 116. The self-load state may be used to inspect operation of the engine or other components of the circuit 102. The controller 132 can close the bypass switches 204A, 204B to change the state of the circuit 102 and the braking circuit 118 to the self-load state. The bypass switches 204 are connected in series with the resistor R1 or R2 of the same inverter leg 210 or 212 between the positive DC bus 134 and the conductive bus 138 connected with the same inverter leg 210 or 212. Closing the bypass switch 204 for an inverter leg 210 and/or 212 causes the DC conducted along the positive DC bus 134 to bypass the inverter switches 202 in the same inverter leg 210, 212 so that the inverter switches 202 cannot convert the DC into AC for powering the motor 114 or 116. The controller 132 may change how the inverter switches 202 are controlled during the self-load state. For example, the controller 132 may open the inverter switches 202 and keep the inverter switches 202 open, instead of modulating the state of the inverter switches 202 at a switching frequency.

Another, different state is a braking state. In this state, the motors 114, 116 are used to regenerate current to slow or stop movement of the vehicle, as described above. The controller 132 can close the bypass switches 204A, 204B but also can switch the inverter switches 202 between closed and open states. This will cause the legs of the inverter 200 (with each leg including the switches 202A, 202C or 202B, 202D) to operate as a chopper by switching back and forth between a conducting state and a non-conducting state. This, in turn, modulates the resistance through which regenerated current from the motor 114 or 116 is conducted.

For example, during time periods that the switches 202 in an inverter leg are closed, the phase of the regenerated current conducted through that leg can be conducted out of the inverter 200 and to the legs 120, 122, 124, and/or 126 for dissipation as heat, as described above. During other time times that the switches 202 in the inverter leg are open, the phase of the regenerated current conducted through that leg can be conducted through the corresponding resistor R1 or R2 to add to the total resistance provided for dissipation of the regenerated current. For example, if the switches 202A, 202C in the left-most inverter leg in FIG. 2 are open and the switch 204A is closed, then the regenerated current conducted from the motor 114 or 116 into that inverter leg is conducted through the resistor R1 for partial dissipation as heat. Because the controller 132 is modulating (e.g., changing with respect to time) which switches 202 are open or closed at different times, the resistors R1, R2 that contribute to the total resistance provided by the resistors 130 and the resistors R1, R2 have time to cool down between time periods that the resistors R1, R2 conduct and dissipate regenerated current.

Controlling the inverter 200 as described above reconfigures the inverter 200 to operate as a chopper to modulate the resistance used to dissipate the regenerated current without adding additional components to the inverter 200 or braking circuit 118. The inverter 200 can regulate the DC link against over voltages during dynamic braking by preventing too much regenerated current being conducted onto the buses 134, 136. For example, during time periods of increased regenerated current, the inverter 200 can open the switches 202 to direct the increased regenerated current through the resistors R1 and/or R2 to reduce the regenerated current conducted to the leg(s) 120, 122, 124, and/or 126.

Figure 3:
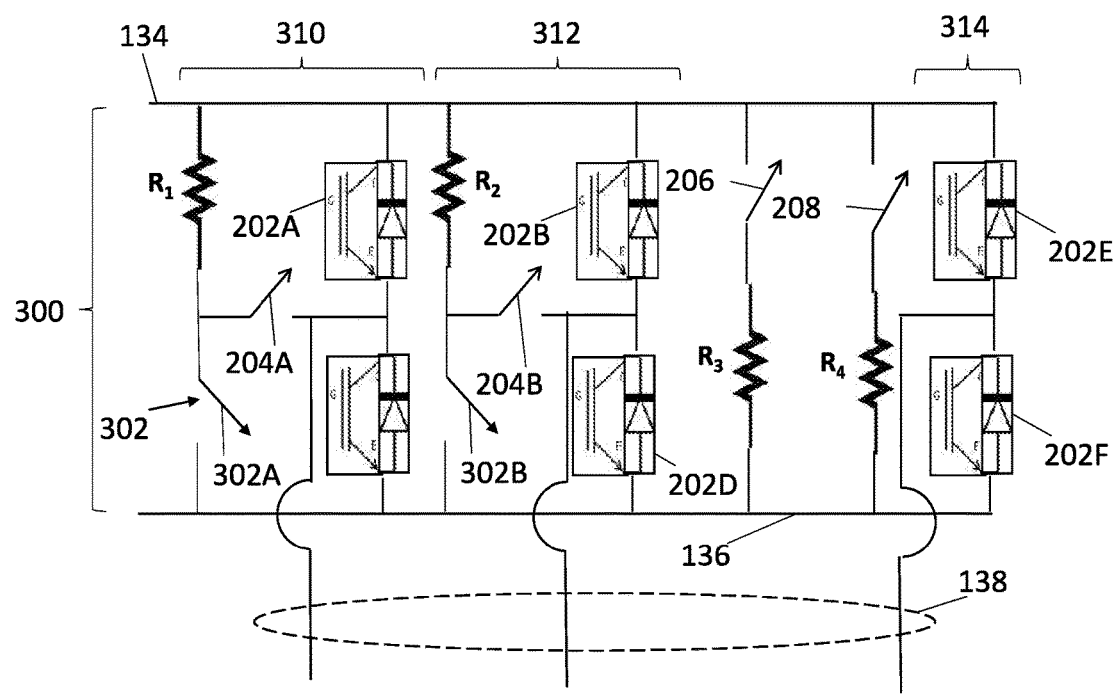
FIG. 3 illustrates another embodiment of an inverter.

FIG. 3 illustrates another embodiment of an inverter 300. The inverter 300 may represent one or more of the inverters 110, 112 shown in FIG. 1. Similar to the inverter 200 shown in FIG. 2, the inverter 300 includes several inverter switches 202 (e.g., switches 202A-F), resistors R1-R4, bypass switches 204, and switches 206, 208. The switches 202, 204 are communicatively coupled with the controller 132 by one or more wired and/or wireless connections to allow the controller 132 to dictate and control which switches 202, 204 are open and which are closed at different times. The inverter 300 is connected with the positive DC bus 134 and the negative DC bus 136. The inverter 300 also is connected with a motor 114, 116 (shown in FIG. 1) by the conductive buses 138. The controller 132 dictates when the different switches 202 are open or closed to convert the DC received on the bus 134 to AC that is supplied to the motor 114 or 116 via the buses 138, as described above.

One difference between the inverters 200, 300 is the addition of bypass switches 302 (e.g., switches 302A-B). The switches 302 can represent solid state switches or mechanical switches, such as IGBTs, contactors, or the like. The inverter 300 includes several inverter legs 310, 312, 314 with a different conductive bus 138 of the motor 114 or 116 connected with a different inverter leg 310, 312, 314 in a location between the inverter switches 202 of the same inverter leg 310, 312, 314. In each of the legs 310, 312 of the inverter 300, the bypass switch 302 is disposed between the resistor R1 or R2 and the negative DC bus 136, with the bypass switch 204 in the same leg being connected with the resistor R1 or R2 and the bypass switch 302 in a location between the resistor R1 or R2 and the bypass switch 302. The bypass switch 302 also is connected with the negative DC bus 136, as shown in FIG. 3.

During motoring, the controller 132 can control the inverter 300 similar to the inverter 200. The controller 132 can open the switches 302 and open the switches 204A, 204B. The remaining switches 204C-F can remain closed. This causes the DC conducted along the positive DC bus 134 to be conducted into the switches 202 for converting the DC into AC. As described above, the switches 202 can alternate between open and closed states to convert the DC received on the buses 134, 136 to an AC that is conducted to the motor 114 or 116 along the buses 138. In this state, the inverter 300 powers the motor 114 or 116 to propel the vehicle along a route.

During the self-load state, the controller 132 can close the switches 204A, 204B similar to the inverter 200. In contrast to the inverter 200, the controller 132 also can close the switches 302. This causes current on the DC buses 134, 136 to be conducted through the resistors R1, R2 and bypass the switches 202 in the inverter legs. The DC is conducted along the positive DC bus 134 and bypasses the switches 202 through the resistor R1 or R2. Closing the switches 302 can allow the controller 132 to avoid changing how the switches 202 are controlled during the self-load state relative to the motoring state. Because the switches 202 are bypassed through the resistor R1 or R2 and the closed switches 302, the controller 132 does not need to change how the switches 202 are controlled when compared to operating in the motoring state.

During braking, the motors 114, 116 are used to regenerate current to slow or stop movement of the vehicle, as described above. The controller 132 can close the switches 204A, 204B and open the switches 302, but also can switch the switches 202 between closed and open states. This will cause the legs of the inverter 200 (with each leg including the switches 202A, 202C or 202B, 202D) to operate as a chopper by switching back and forth between a conducting state and a non-conducting state. This, in turn, modulates the resistance through which regenerated current from the motor 114 or 116 is conducted.

For example, during time periods that the switches 202 in an inverter leg are closed, the phase of the regenerated current conducted through that leg can be conducted out of the inverter 200 and to the legs 120, 122, 124, and/or 126 for dissipation as heat, as described above. During other time times that the switches 202 in the inverter leg are open, the phase of the regenerated current conducted through that leg can be conducted through the corresponding resistor R1 or R2 to add to the total resistance provided for dissipation of the regenerated current. For example, if the switches 202A, 202C in the left-most inverter leg in FIG. 2 are open and the switch 204A is closed, then the regenerated current conducted from the motor 114 or 116 into that inverter leg is conducted through the resistor R1 for partial dissipation as heat. Because the controller 132 is modulating (e.g., changing with respect to time) which switches 202 are open or closed at different times, the resistors R1, R2 that contribute to the total resistance provided by the resistors 130 and the resistors R1, R2 have time to cool down between time periods that the resistors R1, R2 conduct and dissipate regenerated current.

Figure 4:
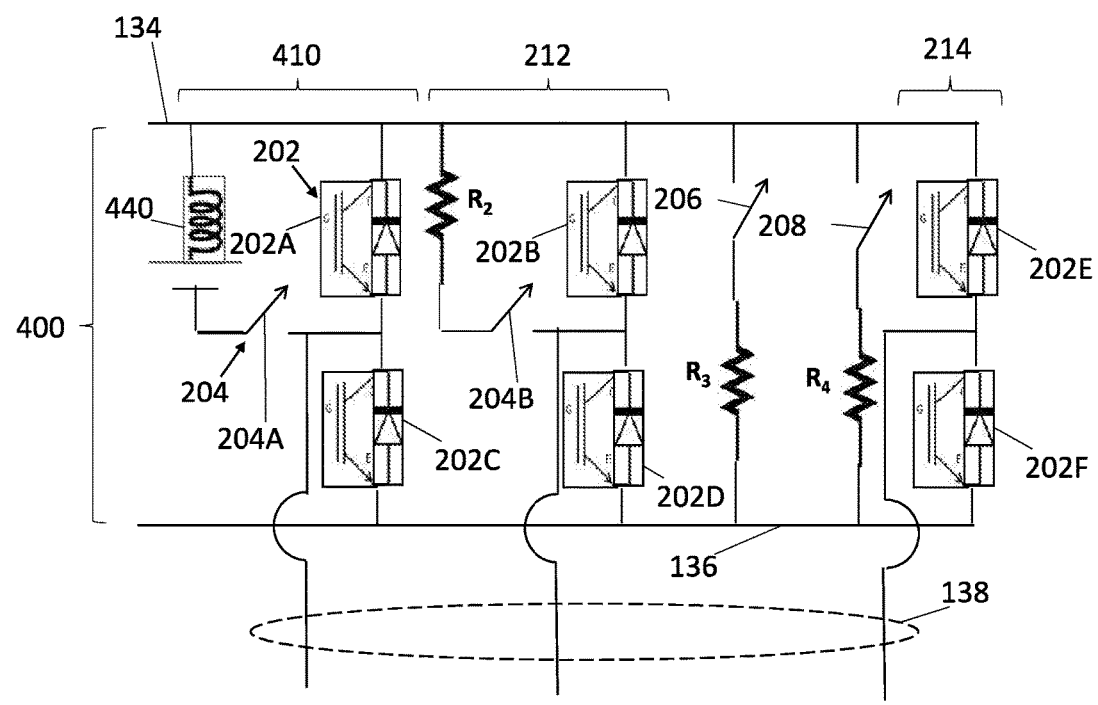
FIG. 4 illustrates another embodiment of an inverter.

FIG. 4 illustrates another embodiment of an inverter 400. The inverter 400 may represent one or more of the inverters 110, 112 shown in FIG. 1. The inverter 400 includes the switches 202, resistors R1-R4, and switches 204, 206, 208 described above in connection with the inverter 200 shown in FIG. 2. Similar to the inverter 200, the inverter 400 is connected with the positive DC bus 134 and the negative DC bus 136. The inverter 200 also is connected with the motor 114, 116 (shown in FIG. 1) by the conductive buses 138.

As shown in FIG. 4, each of the conductive buses 138 is connected with a different inverter leg 410, 212, 214, with each inverter leg including two inverter switches 202 connected in series with each other between the positive and negative DC buses 134, 136. Each conductive bus 138 connects with a different inverter leg in a location between the inverter switches 202 of that inverter leg. The switches 202 can alternate between open and closed states at a switching frequency in order to convert the DC received on the positive and negative DC buses 134, 136 into three phases of AC, with each phase of AC conducted along a different bus 138 to the motor 114 or 116, as described above.

The switches of the inverter 202 can be controlled in a manner similar to the inverter 200, as described in connection with FIG. 2. One difference between the inverter 400 shown in FIG. 4 and the inverter 200 shown in FIG. 2 is the inclusion of an energy storage device 440 in the inverter 400. The energy storage device 440 represents one or more batteries, capacitors, or other devices that receive electric current conducted along the bus 134 when the switch 204A is closed and that can store energy from this current for later extraction and use. As shown in FIG. 4, the energy storage device 440 may be capacitively coupled (e.g., coupled by one or more capacitors) with the switch 204A between the bus 134 and the bus 138 connected to the load or motor. One or more other legs 212, 214 of the inverter 400 optionally may include the energy storage device 440 or additional energy storage devices 440.

During time periods that the switch 204A is closed, the energy storage device 440 may receive and store electric energy from current conducted along the bus 134. This current may later be obtained for powering the load (e.g., the motor) or other devices powered by the inverter 400 by closing the switch 204A.

Figure 5:
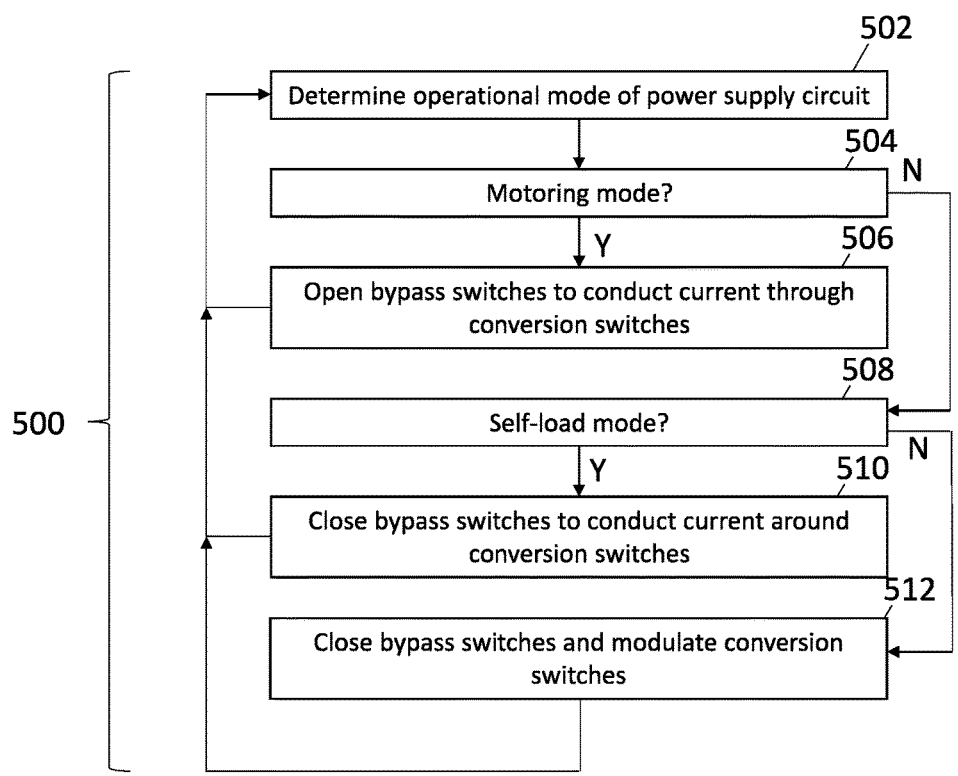
FIG. 5 illustrates a flowchart of one embodiment of a method for operating or controlling a brake system.

FIG. 5 illustrates a flowchart of one embodiment of a method 500 for operating or controlling a brake system. The method 500 may be performed by one or more embodiments of the braking circuit 118 described herein. The method 500 can represent the operations performed by the controller 132 under direction of one or more software applications, and/or may be used (in conjunction with the description herein) to create one or more software applications that direct operations of the controller 132.

At 502, an operational mode of a power supply circuit is determined. The operational mode may be controlled or dictated by input provided by an operator of a powered system (e.g., a vehicle) in which the power supply circuit is disposed and/or may be automatically determined by a plan or schedule that dictates which operational modes are to be in place at different times and/or locations. The operational mode can be a motoring mode (where the vehicle is moving along a route), a self-load mode (where an engine of the vehicle is placed under a load without the vehicle moving along the route), and/or a dynamic braking mode (where the vehicle is braking and motors of the vehicle are created regenerated current to brake the vehicle). The operational mode can be determined by the controller 132 examining the input provided by an operator (e.g., via an input device, such as a touchscreen, lever, pedal, button, etc.) and/or the plan or schedule to determine which operational mode has been selected or is currently being implemented.

At 504, a determination is made as to whether the operational mode is the motoring mode. If the operational mode is a motoring mode, then flow of the method 500 can proceed toward 506. Otherwise, flow of the method 500 may proceed toward 508. At 506, bypass switches in one or more inverters of the power supply circuit are opened. Opening the bypass switches causes DC received by the inverter via the DC buses to be conducted into the inverter switches of the inverter. For example, the bypass switches 204 can be opened in the inverter 200 and the bypass switches 204, 302 in the inverter 300 can be opened to cause the DC to be conducted into the inverter switches 202. The controller 132 can modulate the inverter switches 202 at a switching frequency to convert the DC into AC and to control the speed at which the motor 114, 116 operates. Flow of the method 500 may return back toward 502. The method 500 may operate in a loop-wise manner until the operational mode is changed from the motoring mode to another, different operational mode.

At 508, a determination is made as to whether the operational mode is the self-load mode. If the operational mode is the self-load mode, then flow of the method 500 can proceed toward 510. Otherwise, the operational mode is determined to be the dynamic braking mode, and flow of the method 500 can proceed toward 512. If there are other operational modes, then the method 500 may involve additional operations of determining the operational mode and, responsive to determining that the operational mode is the braking operational mode, the method 500 can proceed toward 512.

At 510, the bypass switches in the inverter(s) are closed to direct the current received by the inverter around the inverter switches. For example, the controller 132 can close the bypass switches 202 in the inverter 200 or can close the bypass switches 202 and the bypass switches 302 in the inverter 300. Closing these bypass switches allows for DC received by the inverter 200, 300 on the positive DC bus 134 to be conducted to the motor 114, 116 without being conducted through the inverter switches. As a result, the DC is not converted into AC that is supplied to the motor 114, 116 for powering the motor.

At 512, in the dynamic braking mode of operation, the bypass switches are closed to direct at least some of the regenerated current from the motor to be conducted through one or more resistors in the inverter. For example, regenerated current from the motors 114, 116 may be conducted along the conductive buses 138 into the corresponding inverters 200, 300. With the bypass switches 204 closed (and the bypass switches 302 open in the inverter 300), the inverter switches 202 may modulate between open and closed states to conduct the regenerated current through the resistors R1, R2 (during time periods that the inverter switches 202 are open). This can increase the total available resistance and braking capability of the braking circuit 118 due to the additional resistance provided by the resistors R1, R2.

In one embodiment, a vehicle brake control system includes an inverter configured to receive direct current (DC) along a bus from a power source and to convert the DC into an alternating current (AC) for a motor of a vehicle. The inverter includes inverter switches configured to alternate between open and closed states to convert the DC to the AC. The inverter also includes a resistor and a bypass switch disposed in series with each other between the bus on which the DC is received and a location between the inverter switches. The system also includes a controller configured to be communicatively coupled with the inverter switches and the bypass switch. The controller is configured to open the bypass switch so that the DC is conducted through and converted into the AC for the motor during a motoring mode. The controller is configured to close the bypass switch so that regenerated current from the motor is conducted through the resistor of the inverter for partial dissipation of the regenerated current during a dynamic braking mode.

In one example, the inverter is configured to be conductively coupled with legs of a braking circuit by the bus. The legs of the braking circuit include dissipation switches and resistors that dissipate the regenerated current during the dynamic braking mode while the switches are closed.

In one example, the controller also is configured to increase a total resistance through which the regenerated current is dissipated during the dynamic braking mode by directing one or more of the dissipation switches to open and disconnect one or more of the resistors in the one or more legs that includes the one or more dissipation switches that were opened. The controller is configured close the bypass switch in the inverter to increase the total resistance through which the regenerated current is dissipated relative to opening the bypass switch during the dynamic braking mode.

In one example, the controller is configured to modulate the inverter switches between the open and closed states during the dynamic braking mode to change when the regenerated current is conducted through the resistor in the inverter and when the regenerated current is conducted through the inverter switches.

In one example, the power source includes an alternator, and the controller is configured to close the bypass switch in the inverter during a self-load operational mode where a load is placed on an engine that drives the alternator to provide the DC on the bus without powering the motor.

In one example, the bypass switch in the inverter is a first bypass switch and the bus is a positive DC bus. The inverter also can include a second bypass switch coupled with a negative DC bus and coupled with the resistor and the first bypass switch in the inverter in a location between the resistor and the first bypass switch.

In one example, the controller is configured to open the second bypass switch during the motoring mode and during the dynamic braking mode. The controller can be configured to close the first bypass switch and the second bypass switch during a self-load mode to conduct the DC around and not through the inverter switches.

In one embodiment, a braking circuit includes plural resistor grid legs configured to be conductively coupled in parallel to each other with a power source via positive and negative direct current (DC) buses. Each of the resistor grid legs includes a respective dissipation switch and a dissipation resistor. The braking circuit also includes an inverter configured to be conductively coupled with the positive and negative DC buses in parallel to the resistor grid legs. The inverter includes inverter switches configured to alternate between open and closed states to convert the DC to an alternating current that powers a motor. The inverter includes an inverter resistor and a bypass switch disposed in series with each other between the positive DC bus and a location between the inverter switches. The circuit also includes a controller configured to be communicatively coupled with the one or more dissipation switches and with the bypass switch. The controller is configured to open at least one of the dissipation switches to disconnect the dissipation resistor in the same resistor grid leg from the motor during a dynamic braking mode. The controller also is configured to close the bypass switch in the inverter so that regenerated current produced by the motor during the dynamic braking mode is conducted through the inverter resistor and at least one of the dissipation resistors in at least one of the resistor grid legs that remains coupled with the motor during the dynamic braking mode.

In one example, the inverter resistor and the dissipation resistors dissipate the regenerated current from the motor during the dynamic braking mode.

In one example, the controller also is configured to increase a total resistance through which the regenerated current is dissipated during the dynamic braking mode by directing one or more of the dissipation switches to open and disconnect one or more of the dissipation resistors in the one or more resistor grid legs that includes the one or more dissipation switches that were opened.

In one example, the controller is configured close the bypass switch in the inverter to increase a total resistance through which the regenerated current is dissipated relative to opening the bypass switch during the dynamic braking mode.

In one example, the controller is configured to modulate the inverter switches between the open and closed states during the dynamic braking mode to change when the regenerated current is conducted through the inverter resistor in the inverter and when the regenerated current is conducted through the inverter switches.

In one example, the power source includes an alternator, and the controller is configured to close the bypass switch in the inverter during a self-load operational mode where a load is placed on an engine that drives the alternator to provide the DC on the positive DC bus without powering the motor.

In one example, the bypass switch in the inverter is a first bypass switch and the inverter also includes a second bypass switch coupled with the negative DC bus and coupled with the resistor and the first bypass switch in the inverter in a location between the resistor and the first bypass switch.

In one example, the controller is configured to open the second bypass switch during the dynamic braking mode. The controller can be configured to close the first bypass switch and the second bypass switch during a self-load mode to conduct the DC around and not through the inverter switches.

In one embodiment, a method includes (during a motoring mode of a vehicle power supply circuit that includes plural resistor grid legs that dissipate regenerated current from one or more motors of the vehicle and that includes one or more inverters having inverter switches that convert a direct current (DC) to an alternating current (AC) that powers the one or more motors) opening one or more first bypass switches in the one or more inverters to direct the DC through the inverter switches. The method also includes (during a dynamic braking mode of the vehicle power supply circuit) closing the one or more first bypass switches to conduct regenerated current created by the one or more motors through one or more inverter resistors instead of through the inverter switches to increase a total resistance through which the regenerated current is dissipated.

In one example, the method also includes (during the dynamic braking mode) modulating the inverter switches between open and closed states.

In one example, the method also includes (during a self-load operational mode) closing the one or more first bypass switches in the one or more inverters.

In one example, the method also includes (during the self-load operational mode) closing one or more second bypass switches in the one or more inverters to conduct the DC around and not through the inverter switches.

In one example, the self-load operational mode includes placing a load on an engine that drives an alternator to provide the DC without powering the one or more motors.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions, numerical values, and types of materials described herein are intended to define the parameters of the inventive subject matter, they are by no means limiting and are example embodiments. Many other embodiments will be apparent to persons of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

The methods described herein may be performed using one or more tangible and non-transitory components, such as one or more processors, controllers, computers, or other devices. The operations described in connection with the methods may be directed by one or more sets of instructions stored on a tangible and non-transitory computer readable medium. For example, software code stored on a tangible and non-transitory memory may be used to direct one or more processors to carry out the operations of the methods.

This written description uses examples to disclose several embodiments of the inventive subject matter and also to enable a person of ordinary skill in the art to practice the embodiments of inventive subject matter, including making and using any devices or systems and performing any incorporated methods. The patentable scope of the inventive subject matter is defined by the claims, and may include other examples that occur to persons of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    an inverter configured to receive direct current (DC) along a bus from a power source and to convert the DC into an alternating current (AC) for a motor of a vehicle, the inverter including inverter switches configured to alternate between open and closed states to convert the DC to the AC, the inverter including a resistor and a bypass switch disposed in series with each other between the bus on which the DC is received and a location between the inverter switches; and
    a controller configured to be communicatively coupled with the inverter switches and the bypass switch, the controller configured to open the bypass switch so that the DC is conducted through and converted into the AC for the motor during a motoring mode, the controller configured to close the bypass switch so that regenerated current from the motor is conducted through the resistor of the inverter for partial dissipation of the regenerated current during a dynamic braking mode.

2. The system of claim 1, wherein the inverter is configured to be conductively coupled with legs of a braking circuit by the bus, the legs of the braking circuit including dissipation switches and resistors that dissipate the regenerated current during the dynamic braking mode while the dissipation switches are closed.

3. The system of claim 2, wherein the controller also is configured to increase a total resistance through which the regenerated current is dissipated during the dynamic braking mode by directing one or more of the dissipation switches to open and disconnect one or more of the resistors in the one or more legs that includes the one or more dissipation switches that were opened,
wherein the controller is configured close the bypass switch in the inverter to increase the total resistance through which the regenerated current is dissipated relative to opening the bypass switch during the dynamic braking mode.

4. The system of claim 1, wherein the controller is configured to modulate the inverter switches between the open and closed states during the dynamic braking mode to change when the regenerated current is conducted through the resistor in the inverter and when the regenerated current is conducted through the inverter switches.

5. The system of claim 1, wherein the power source includes an alternator, and wherein the controller is configured to close the bypass switch in the inverter during a self-load operational mode where a load is placed on an engine that drives the alternator to provide the DC on the bus without powering the motor.

6. The system of claim 1, wherein the bypass switch in the inverter is a first bypass switch and the bus is a positive DC bus, and wherein the inverter also includes a second bypass switch coupled with a negative DC bus and coupled with the resistor and the first bypass switch in the inverter in a location between the resistor and the first bypass switch.

7. The system of claim 6, wherein the controller is configured to open the second bypass switch during the motoring mode and during the dynamic braking mode, the controller is configured to close the first bypass switch and the second bypass switch during a self-load mode to conduct the DC around and not through the inverter switches.

8. The system of claim 1, wherein the inverter includes an energy storage device disposed between the bus and at least one of the inverter switches, the energy storage device configured to store energy from the DC received on the bus while the at least one of the inverter switches that the energy storage device is connected with is closed.

9. A braking circuit comprising:
plural resistor grid legs configured to be conductively coupled in parallel to each other with a power source via positive and negative direct current (DC) buses, each of the resistor grid legs including a respective dissipation switch and a dissipation resistor;
an inverter configured to be conductively coupled with the positive and negative DC buses in parallel to the resistor grid legs, the inverter including inverter switches configured to alternate between open and closed states to convert the DC to an alternating current that powers a motor, the inverter including an inverter resistor and a bypass switch disposed in series with each other between the positive DC bus and a location between the inverter switches; and
a controller configured to be communicatively coupled with the dissipation switches and with the bypass switch, the controller configured to open at least one of the dissipation switches to disconnect the dissipation resistor in the same resistor grid leg from the motor during a dynamic braking mode, the controller also configured to close the bypass switch in the inverter so that regenerated current produced by the motor during the dynamic braking mode is conducted through the inverter resistor and at least one of the dissipation resistors in at least one of the resistor grid legs that remains coupled with the motor during the dynamic braking mode.

10. The braking circuit of claim 9, wherein the inverter resistor and the dissipation resistors dissipate the regenerated current from the motor during the dynamic braking mode.

11. The braking circuit of claim 9, wherein the controller also is configured to increase a total resistance through which the regenerated current is dissipated during the dynamic braking mode by directing one or more of the dissipation switches to open and disconnect one or more of the dissipation resistors in the one or more resistor grid legs that includes the one or more dissipation switches that were opened.

12. The braking circuit of claim 9, wherein the controller is configured close the bypass switch in the inverter to increase a total resistance through which the regenerated current is dissipated relative to opening the bypass switch during the dynamic braking mode.

13. The braking circuit of claim 9, wherein the controller is configured to modulate the inverter switches between the open and closed states during the dynamic braking mode to change when the regenerated current is conducted through the inverter resistor in the inverter and when the regenerated current is conducted through the inverter switches.

14. The braking circuit of claim 9, wherein the power source includes an alternator, and wherein the controller is configured to close the bypass switch in the inverter during a self-load operational mode where a load is placed on an engine that drives the alternator to provide the DC on the positive DC bus without powering the motor.

15. The braking circuit of claim 9, wherein the bypass switch in the inverter is a first bypass switch and the inverter also includes a second bypass switch coupled with the negative DC bus and coupled with the inverter resistor and the first bypass switch in the inverter in a location between the inverter resistor and the first bypass switch.

16. The braking circuit of claim 15, wherein the controller is configured to open the second bypass switch during the dynamic braking mode, the controller configured to close the first bypass switch and the second bypass switch during a self-load mode to conduct the DC around and not through the inverter switches.

17. A method comprising:
during a motoring mode of a vehicle power supply circuit that includes plural resistor grid legs that dissipate regenerated current from one or more motors of the vehicle and that includes one or more inverters having inverter switches that convert a direct current (DC) to an alternating current (AC) that powers the one or more motors, opening one or more first bypass switches in the one or more inverters to direct the DC through the inverter switches; and
during a dynamic braking mode of the vehicle power supply circuit, closing the one or more first bypass switches to conduct regenerated current created by the one or more motors through one or more inverter resistors instead of through the inverter switches to increase a total resistance through which the regenerated current is dissipated.

18. The method of claim 17, further comprising, during the dynamic braking mode, modulating the inverter switches between open and closed states.

19. The method of claim 17, further comprising, during a self-load operational mode, closing the one or more first bypass switches in the one or more inverters.

20. The method of claim 19, further comprising, during the self-load operational mode, closing one or more second bypass switches in the one or more inverters to conduct the DC around and not through the inverter switches.

21. The method of claim 19, wherein the self-load operational mode includes placing a load on an engine that drives an alternator to provide the DC without powering the one or more motors.

\* \* \* \* \*